United States Patent [19]
Kawamoto et al.

[11] Patent Number: 5,338,607
[45] Date of Patent: Aug. 16, 1994

[54] 1.3 MICROMETER-BAND AMPLIFYING OPTICAL FIBER PREFORM

[75] Inventors: Hiromi Kawamoto; Yoshinori Kubota; Natsuya Nishimura; Akira Sakanoue, all of Ube, Japan

[73] Assignee: Central Glass Company, Limited, Ube, Japan

[21] Appl. No.: 6,340

[22] Filed: Jan. 19, 1993

[30] Foreign Application Priority Data

Jan. 20, 1992 [JP] Japan .................................. 4-007821

[51] Int. Cl.$^5$ .............................................. B32B 17/02
[52] U.S. Cl. .................... 428/373; 428/378; 428/379; 428/380; 428/384; 428/392; 428/428; 428/432; 428/542.8; 359/341
[58] Field of Search ............... 428/373, 384, 380, 379, 428/428, 432, 392, 378, 542.8; 359/341; 385/141, 142, 144

[56] References Cited
U.S. PATENT DOCUMENTS

| | | | |
|---|---|---|---|
| 4,674,835 | 6/1987 | Mimura | 428/373 |
| 4,874,222 | 10/1989 | Vacha | 428/384 |
| 4,898,777 | 2/1990 | Kindler | 428/392 |
| 5,062,116 | 10/1991 | Christensen | 428/432 |

Primary Examiner—Ellis P. Robinson
Assistant Examiner—Timothy M. Speer
Attorney, Agent, or Firm—Keck, Mahin & Cate

[57] ABSTRACT

An optical fiber preform includes a core made from a fluoride glass which is doped with a rare earth, and a cladding surrounding the core. The cladding is made from one of an oxide glass and a fluoroxide glass. The core has a characteristic of amplification at 1.3 μm-band. The cladding does not have absorption at 1.3 μm-band. The preform is useful as a material for a fiber optical amplifier in optical communication systems.

4 Claims, 2 Drawing Sheets

1.3 MICROMETER-BAND AMPLIFYING OPTICAL FIBER PREFORM

BACKGROUND OF THE INVENTION

This invention relates to a 1.3 μm-band amplifying optical fiber preform of an optical fiber which is used for a fiber optical amplifier in optical communication systems.

There is an increasing demand to directly amplify light signals in optical communication systems. For this purpose, fiber optical amplifiers have been recently developed. As compared with electrical amplification in which light signals are converted into electrical signals, fiber optical amplifiers which directly amplify light signals by stimulated emission have superior characteristics such as higher gain, lower noise, broader bandwidth, compactness of the product size and lower price.

In optical communication systems, 1.3 μm-band and 1.5 μm-band are mainly used. With respect to 1.5 μm-band, the practical applicability of fiber optical amplifiers has been demonstrated with using a erbium doped silica glass fibers. On the other hand, development of fiber optical amplifiers operating at 1.3 μm-band is still under way. Hitherto, various oxide glass fibers such as silica glass fiber, which are doped with rare earth ions such as neodymium ion ($Nd^{3+}$) as an active ion have been proposed to be used for fiber optical amplifiers operating at 1.3 μm-band. However, these fibers do not exhibit a sufficiently high gain at 1.3 μm-band, because of the presence of strong excited state absorption (ESA). Thus, fluoride glass fibers have been proposed to be used for fiber optical amplifiers operating at 1.3 μm-band. Fluoride glass fibers can suppress ESA and get a sufficiently high gain. In fluoride glass fibers, it is conventional to use fluoride glass for both of a core and a cladding of the fiber. It is usual to prepare a preform of this type of fluoride glass fiber by build-in casting method [see Phys. Chem. Glasses, 23(6), 196 (1982)] or by rotational casting method [see Electron. Lett., 18, 657 (1981)] because fluoride glasses are more easily crystallized and low in weatherability as compared with common oxide glasses.

However, in the case that both of the cladding and the core are made from fluoride glass, it is difficult to get the above range of the diametral ratio by decreasing diameter of the core through the above-mentioned build-in casting method or the rotational casting method. The reason of this is that the minimum diameter of the core which can be produced by the above methods is several millimeters. Furthermore, in the case that both of the cladding and the core are made from fluoride glass, it is difficult to get the above range of the diametral ratio by increasing diameter of the cladding. The reason of this is that fluoride glass is easy to be crystallized. Therefore, there is a certain limit in enlargement of the size of the cladding. There is another proposal to increase diameter of the cladding by jacketing of fluoride glass tube. However, the thus formed cladding is insufficient in mechanical strength.

It is usual to widen specific refractive index difference between the cladding and the core by adding specific elements or by varying glass composition. However, in the case that both of the cladding and the core are made from fluoride glass, it is difficult to sufficiently widen the difference because fluoride glass tends to be crystallized by doping and by varying composition.

SUMMARY OF THE INVENTION

It is therefore an object of the present invention to provide a 1.3 μm-band amplifying optical fiber preform of which diametral ratio of cladding to core is sufficiently high and of which specific refractive index difference between the cladding and the core is sufficiently wide, so as to improve efficiency of amplification of a fiber optical amplifier. To improve efficiency of amplification by optical fiber amplifiers, it is desired to increase diametral ratio of cladding to core to 50:1 or more and to widen specific refractive index ratio between the cladding and the core to 3.5% or more.

According to the present invention, there is provided an optical fiber preform comprising: a core made from a fluoride glass which is doped with a rare earth; and a cladding surrounding said core, said cladding being made from one of an oxide glass and a fluoroxide glass.

The cladding does not have absorption at a wavelength of a pump source such as 0.98 μm, and nor at an amplification wavelength of 1.3 μm.

DESCRIPTION OF THE PREFERRED EMBODIMENTS

Figure 1:
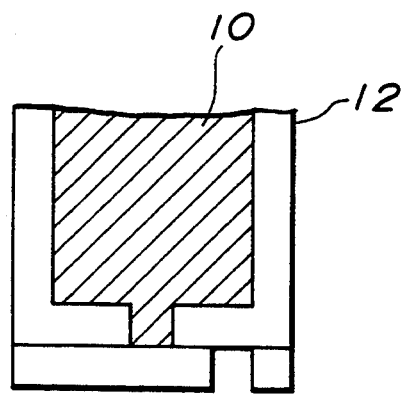
FIGS. 1 to 3 are sectional views, showing a sequential process of preparing a cylindrical glass body for making an optical fiber preform, in accordance with the present invention.
Figure 2:
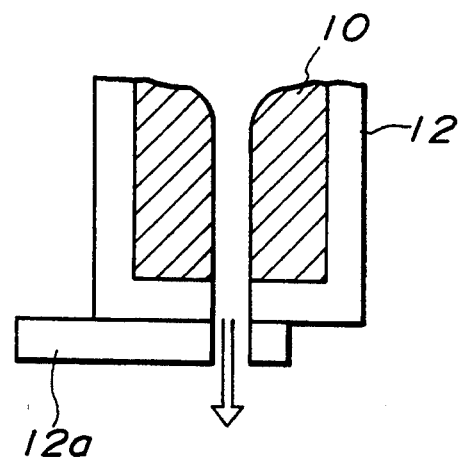
Figure 3:
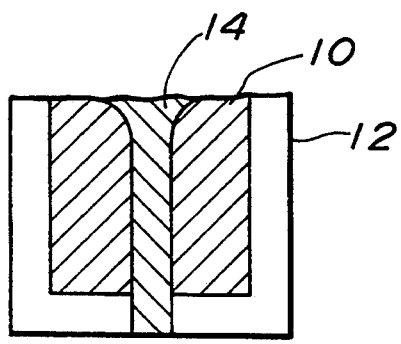
Figure 4:
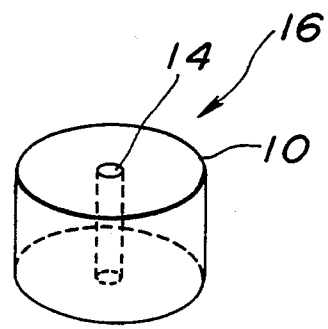
FIG. 4 is a perspective view of the cylindrical glass body.

According to the present invention, there is provided a preform of an optical fiber which is used for a fiber optical amplifier. The preform comprises a core and a cladding surrounding the core. In the invention, the core is made from fluoride glass and has a 1.3 μm-band amplifying characteristic. To provide the preform with this characteristic, the material of the core is not limited to a certain specific fluoride glass. Examples of the fluoride glasses are $AlF_3$—$RF_2$—MF glass (R represents an alkali earth metal and M represents an alkali metal) such as $AlF_3$—$YF_3$—$BaF_2$—$CaF_2$ glass and $AlF_3$—$CdF_2$—$PbF_2$—LiF glass, $ZrF_4(HfF_4)$—$RF_2$—MF glass such as $ZrF_4$—$BaF_2$—$LaF_3$—$AlF_3$—NaF glass and $ZrF_4$—$BaF_2$—$LaF_3$—$AlF_3$—LiF glass, and $InF_3$—$RF_2$ glass such as $InF_3$—$BaF_2$—$ThF_4$—$YbF_3$—$ZnF_2$ glass.

In the present invention, a rare earth such as Nd or praseodymium (Pr) is added to the fluoride glass of the core. Preferable concentration of the rare earth in the fluoride glass is up to several thousands ppm.

In the invention, wavelength of a pump source is not limited to a certain value. It is usual to use 0.8 μm-band and 1 μm-band as wavelengths of a pump source for a Nd-doped core and a Pr-doped core, respectively. According to the present invention, the cladding of the preform is made from an oxide glass or a fluoroxide glass. Examples of the oxide glass are a silicate glass such as $SiO_2$—RO—$M_2O$ glass (R represents an alkali earth metal and M represents an alkali metal) and a phosphate glass such as $P_2O_5$—RO—$M_2O$ glass. Examples of the fluoroxide glasses are fluorophosphate glasses such as $P_2O_5$—$AlF_3$—$RF_2$—MF glass and $P_2O_5$—$ZrF_4$—$RF_2$—MF glass. In the above examples, it is preferable to use an alkali earth metal and an alkali metal which have small atomic numbers. With this, refractive index of the cladding can be made low.

It is preferable that thermal characteristics (glass-transition temperature, thermal expansion coefficient and viscosity characteristic) of the cladding material are close to those of the core material. If the former and the latter are very different, cracks tend to occur.

The cladding material according to the present invention is a glass which is not crystallized at a preform-forming temperature and at a fiber-forming temperature. If it is crystallized at the temperatures, the mechanical strength of the cladding is lowered and light signal loss is increased.

The method of forming the preform is not limited to a specific method. For example, the conventional build-in casting method and the rotational casting method can be taken.

The advantages of using an oxide glass or a fluoroxide glass for the cladding will be described in the following.

In the invention, the diametral ratio of cladding to core can be sufficiently increased by increasing the size of the cladding. It should be noted that the cladding size can be increased without having crystallization. With this, amplification efficiency is improved.

In the invention, the preform can be formed by, for example, a method in which a solidified cladding is heated up to around glass-transition temperature, and a melted core material is poured into the center of the cladding tube and solidified. If a preform is formed by this method with using fluoride glass for the cladding material, crystallization will occur at the interface between the cladding and the core.

In the invention, selection of the glass composition for the cladding becomes wider, as compared with that for a cladding made from fluoride glass. Therefore, the specific refractive index difference can be easily increased.

As compared with a cladding made from fluoride glass, the cladding according to the invention becomes superior in weatherability. To make the cladding according to the invention, it is not necessary to form a fiber in the atmosphere of inert gas. If fluoride glass is used for a cladding, it tends to react with water, etc. and to be crystallized. Therefore, in this case, it is necessary to form a fiber in the atmosphere of inert gas.

In the following, the present invention will be described with reference to a nonlimitative example.

EXAMPLE

According to the present invention, a method of preparing a preform of an optical fiber will be described with reference to FIGS. 1 to 7.

To prepare the cladding material, a batch of glass composition was prepared by mixing 15 mol % of Al($PO_3)_3$, 15 mol % of $AlF_3$, 5 mol % of $MgF_2$, 15 mol % of $CaF_2$, 15 mol % of $SrF_2$, 15 mol % of $BaF_2$, 10 mol % of LiF and 10 mol % of NaF. 1.5 kg of the batch was put into a platinum crucible, and melted at a temperature of 950° C. for 1.5 hr. Then, as is seen from FIG. 1, the melted cladding material 10 was poured into a mould 12 heated at a temperature of around 340° C. As is seen from FIG. 2, during cooling of the melted cladding material, a base plate portion 12a of the mould 12 was slid so as to make a central portion of the cladding material body 10 flow out from the mould. Then, the mould 12 having the cladding material 10 therein was put into a furnace heated at a temperature of 340° C.

To prepare the core material, a batch of glass composition was prepared by mixing 30 mol % of $AlF_3$, 20 mol % of $YF_3$, 7 mol % of $MgF_2$, 15 mol % of $BaF_2$, 25 mol % of $PbF_2$ and 3 mol % of NaF. 1000 ppm by weight of $PrF_3$ was added to 30 g of the batch. Then, the batch was put into an amorphous carbon crucible, and melted at a temperature of 950° C. for 2 hr. Then, the temperature was lowered to 700° C., and this temperature was maintained for 30 min.

After solidifying the cladding material, the mould heated at a temperature of 340° C. was taken out of the furnace. Then, as is seen from FIG. 3, the melted core material 14 was poured into a central opening of the cladding material body 10. After that, the mould 12 was annealed in a furnace heated at a temperature of 360° C. After cooling to room temperature, a cylindrical glass body 16 having a diameter of 150 mm and a height of 50 mm was obtained. The diameter of the core was 2 to 3 mm.

Figure 5:
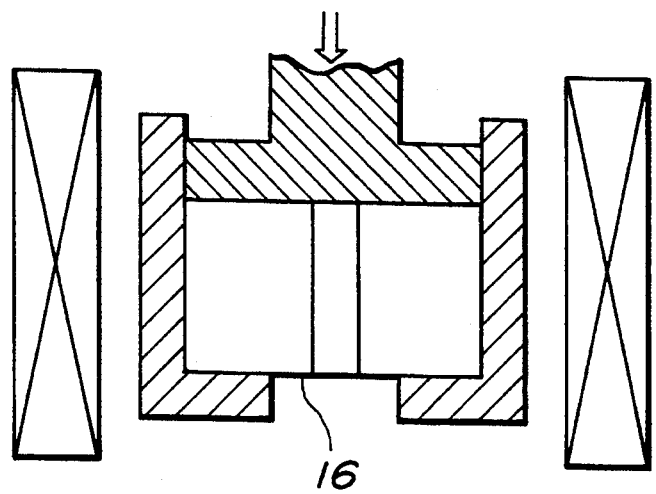
FIGS. 5 and 6 are sectional views, showing a sequential process of preparing the preform from the cylindrical glass body with using an extruder.
Figure 6:
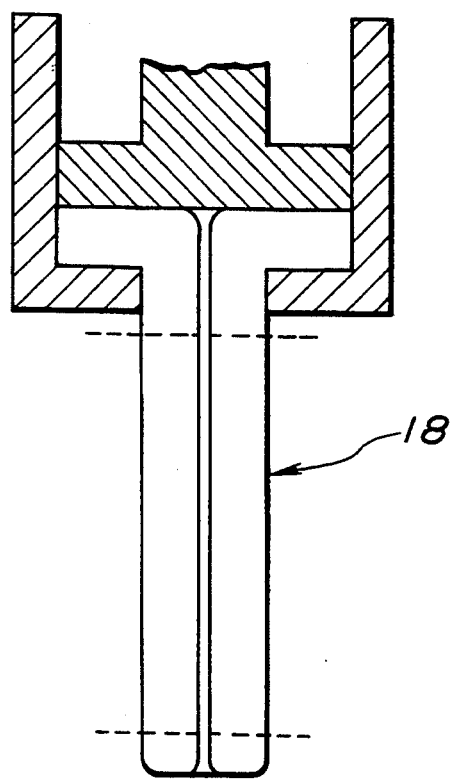
Figure 7:
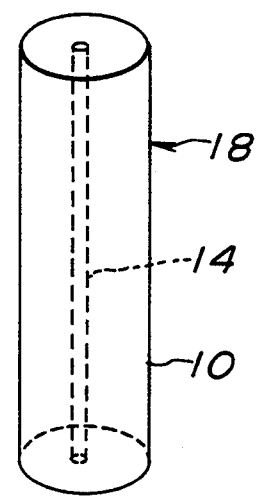
FIG. 7 is a perspective view of the preform.

As is seen from FIGS. 5 and 6, the cylindrical glass body 16 was extruded with a certain pressure at a temperature of 410° C. With this, a cylindrical preform 18 having a core diameter of 0.4 to 0.5 mm, an outer diameter of 25 mm and a height of 150 mm was obtained. The preform was sectioned by a thickness of 5 mm. The sectioned preform was observed with an optical microscope. With this, impurities such as crystals and bubbles were not found. He—Ne laser beam was applied to the interface between the core and the cladding. With this, interfacial scattered light was not observed with naked eyes. Refractive indices of the cladding and the core was 1.459 and 1.515, respectively. Therefore, the specific refractive index difference is calculated as about 3.8%.

What is claimed is:

1. A 1.3 μm-band amplifying optical fiber preform having a core and a cladding, wherein the diametral ratio of cladding to core is 50:1 or more and the specific refractive index ratio of cladding to core is 3.5% or more, said preform comprising:
    a core made from a fluoride glass which is doped with a rare earth; and
    a cladding not having absorption at an amplification wavelength of 1.3 μm surrounding said core and being selected from the group consisting of oxide glasses and fluoroxide glasses.

2. An optical fiber preform according to claim 1, wherein said oxide glass is a silicate glass.

3. An optical fiber preform according to claim 1, wherein said oxide glass is a phosphate glass.

4. An optical fiber preform according to claim 1, wherein said fluoroxide glass is a fluorophosphate glass.

* * * * *